United States Patent [19]
Taylor et al.

[11] Patent Number: 5,430,365
[45] Date of Patent: Jul. 4, 1995

[54] POWER REGULATION FOR REDUNDANT BATTERY SUPPLIES

[75] Inventors: Mark A. Taylor, Cupertino; Samson K. Toy, Sunnyvale, both of Calif.

[73] Assignee: Tandem Computers Incorporated, Cupertino, Calif.

[21] Appl. No.: 87,241

[22] Filed: Jul. 2, 1993

[51] Int. Cl.[6] .................................................. G05F 1/56
[52] U.S. Cl. .................................... 323/273; 323/274; 323/303
[58] Field of Search ............... 323/274, 273, 275, 303, 323/349, 281

[56] References Cited

U.S. PATENT DOCUMENTS

| | | | |
|---|---|---|---|
| 3,761,801 | 9/1973 | Sheng | 323/274 |
| 4,146,832 | 3/1979 | McConnell | 323/17 |
| 4,209,710 | 6/1980 | Quarton | 307/66 |
| 4,400,661 | 8/1983 | Duley | 323/275 |
| 4,536,699 | 8/1985 | Baker | 323/276 |
| 4,538,102 | 8/1985 | Takagi et al. | 323/349 |
| 4,598,243 | 7/1986 | Kawakami | 323/349 |
| 5,191,278 | 3/1993 | Carpenter | 323/275 |
| 5,200,692 | 4/1993 | Krinsky et al. | 323/269 |
| 5,254,937 | 10/1993 | Mizoguchi | 323/283 |

OTHER PUBLICATIONS

Electronics vol. 52 No. 8 Apr. 12, 1979 Micropower regulator has low dropout voltage.

Primary Examiner—Steven L. Stephan
Assistant Examiner—Adolf Berhane
Attorney, Agent, or Firm—Townsend and Townsend Khourie and Crew

[57] ABSTRACT

A regulator circuit supplies a regulated low, DC voltage that is derived from an unregulated voltage provided by a pair of redundant batteries. The regulator circuit comprises regulation control that responds to a feedback signal developed from monitoring the regulated voltage to maintain the regulated voltage at a desired level. Battery monitors supervise the voltage levels of the batteries used, and shut down the regulator when the battery voltages drop below a predetermined voltage level to preserve battery life.

24 Claims, 2 Drawing Sheets

POWER REGULATION FOR REDUNDANT BATTERY SUPPLIES

BACKGROUND OF THE INVENTION

The present invention is directed generally to voltage regulation circuits, and more particularly to a circuit that supplies a regulated voltage from a battery.

It is common in the computing industry to use some type of backup power to maintain various data processing circuitry when main or primary power is removed, either inadvertently or intentionally. Often in the form of batteries, such backup power is, for example, to sustain the data stored in memories, or other storage devices, when main power is removed. Another application, one using the present invention, is to use the same backup power to maintain operation of a real time clock system in absence of main power.

Typically, larger (i.e., so-called mainframe) data processing systems are provided lead-acid batteries, or the like to provide a backup nominal DC voltage of 24 volts. The actual voltage range can vary from 26 volts DC or greater (when charging or fully charged) to a depleted terminal voltage of about 19 volts DC. Using this type of battery backup to maintain operation of low voltage (e.g., 3–5 volts DC) circuits when primary power is lost presents a difficult regulation problem, given this 7 volt variance, in order that the drop in terminal voltage not be reflected to the backed up circuitry.

There are regulation circuits on the market today that may solve this larger terminal voltage variance problem, but at the expense of what can be considered consumption of excessive current. (Excessive in some cases can be as little as 1 mA. This low value can become "excessive" when the circuit using the backup runs continuously over a period of months.) This, in turn, results in short-lived battery backup, damage to the batteries by discharging them too deeply, or both.

Thus, it can be seen that some means is needed for supplying a regulated low voltage (e.g., about 3 volts DC) from a backup high DC voltage source (e.g., 24 volts DC) in a manner that maintains the regulated low voltage constant in the face of depletion of the battery over time, while at the same time limiting the current consumed by the regulation effort.

SUMMARY OF THE INVENTION

The present invention provides a voltage regulating circuit that develops, from redundant, unregulated, nominal 24 VDC batteries used for memory backup, a nominal 3.2 VDC backup voltage. The regulating circuit is designed to consume a minimum amount of current while performing the regulation activity, and maintains the nominal regulated (3.2 V) voltage over the expected voltage range of, for example, lead-acid batteries. In addition, the regulation operation is performed in a manner that isolates the redundant batteries from one another.

In the preferred embodiment of the invention, a variable impedance, in the form of a transistor, is coupled to receive the unregulated DC voltage to provide therefrom the regulated DC voltage of approximately 3.2 volts. A control circuit maintains the regulated voltage at a fixed voltage level, and also develops an error signal that is indicative of any rise or fall of the regulated voltage. The error signal is coupled to the variable impedance to vary the current conducted by the transistor and, thereby, the voltage dropped by the transistor so that the supplied regulated voltage is maintained at the desired voltage level.

The invention is configured to supply a regulated voltage from an unregulated DC voltage source comprising pair of redundant batteries. In order to keep from discharging the batteries too deeply, regulator circuit includes a battery sense circuit for each of the redundant batteries that operates to detect when the terminal voltage of the corresponding battery drops below a predetermined level. When both batteries drop below the predetermined level, the corresponding battery sense circuits jointly communicate that fact to the control circuit to force de-assertion of the error signal, terminating conduction of the transistor, and shutting down operation of the regulator. Thereafter, only minimum current is drawn.

A number of advantages are achieved by the present invention. First, a regulated low DC voltage (3.2 V), is developed from a redundant pair of much higher voltage (nominally, 24 V) batteries with a minimum of current consumption over the voltage range of each battery to perform the regulation activity.

In addition, the present invention includes with its regulation activity the function of monitoring the terminal voltage of the batteries to terminate much of the current being drawn in order to prevent deep discharges of the batteries and thereby protect them from damage.

Further, combined with these advantages is the additional advantage that the regulation is conducted over the relatively wide DC voltage range that can be expected for the type of batteries used (i.e., lead-acid batteries) while maintaining the supplied, regulated voltage at a fixed level.

These and other advantages of the present invention will be seen by those skilled in the art upon reading of the following detailed description, which should be taken in conjunction with the accompanying drawings.

DESCRIPTION OF THE PREFERRED EMBODIMENT

Figure 1:
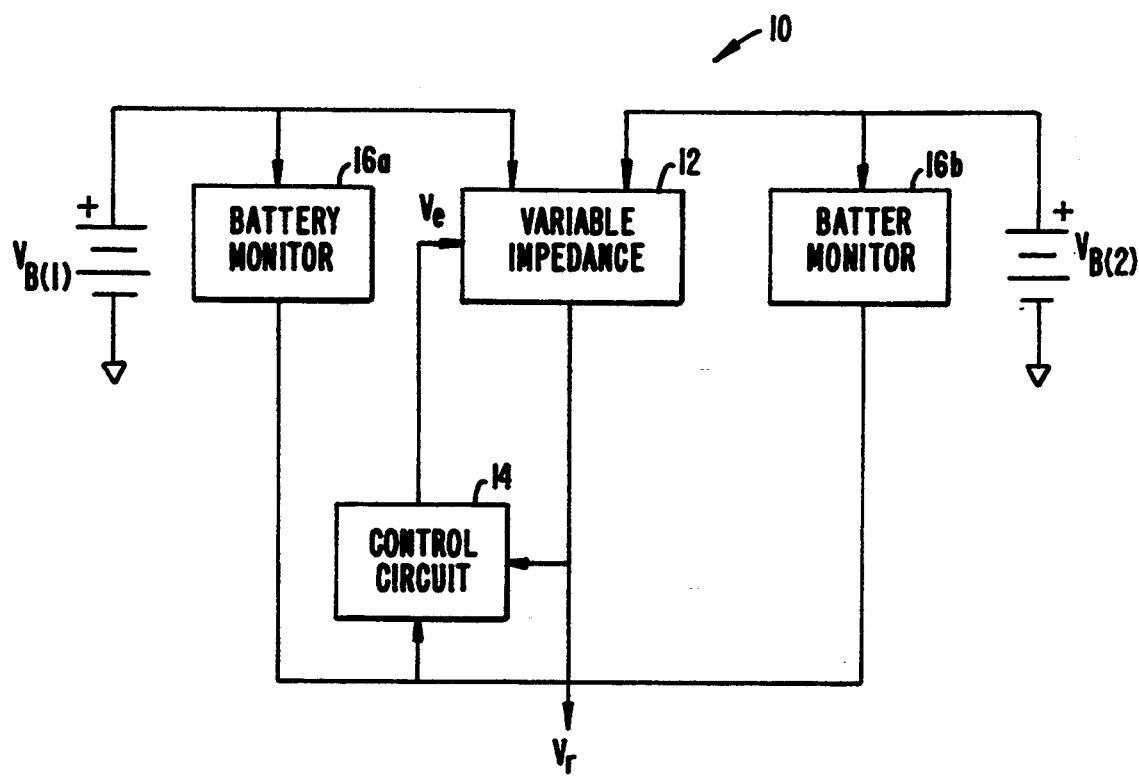
FIG. 1 is a block diagram of the regulator circuit of the present invention, shown developing a regulated voltage (Vr) from a pair of redundant batteries.

Referring to the figures, and for the moment FIG. 1, illustrated, and designated with the reference numeral 10, is a regulator system constructed according to the present invention. The regulator system 10 is shown supplying a regulated voltage, Vr, from an unregulated DC source, comprising (preferably, lead-acid) batteries $V_{B(1)}$ and $V_{B(2)}$ both of which are nominally 24 volts.

The regulator system 10 includes a variable impedance 12 that receives the positive (+) terminals of the two batteries $V_{B(1)}$ and $V_{B(2)}$ to supply the regulated voltage Vr. A control circuit 14 monitors the regulated voltage Vr, maintaining is at the desired voltage level. Any change in the regulated voltage from the desired voltage level will result in the control circuit 14 developing an error voltage Ve that is applied to control amount of DC voltage dropped across the variable impedance 12.

Briefly, the regulator system 10 operates as follows. The variable impedance 12 functions to balance current drawn from the batteries $V_{B(1)}$ and $V_{B(2)}$, and to drop the DC voltage they supply to the much lower voltage Vr (preferably approximately 3.2 VDC). Any variance from the desired regulated voltage, Vr, will result in an error signal (Ve) being developed by the control circuit 14. The control signal Ve is applied to the variable impedance 12 to adjust the voltage dropped by the variable impedance 12 and, in turn, correct the regulated voltage Vr accordingly. In this manner the regulated voltage Vr is maintained at a fixed voltage level regardless of the changes, e.g., over time, experienced by the batteries $V_{B(1)}$ and $V_{B(2)}$.

The regulator system 10 further includes, for each of the batteries $V_{B(1)}$, $V_{B(2)}$, an associated battery sense circuits 16a, 16b, respectively. The battery sense circuits 16 operate to track the terminal voltage of each battery. If that terminal voltage of one of the batteries drops below a predetermined safe level, the corresponding battery sense circuit 16 will substantially turn off the current from that battery to the regulator circuit 10. If both batteries drop to or below the predetermined safe level, the control circuit 14 is switched off to, in effect, open the connection maintained by the variable impedance 12 between the unregulated voltage of the batteries and the regulated voltage Vr. Thus, the sense circuits 16 of the regulator system 10 operate to protect the batteries against over-discharge damage.

Figure 2:
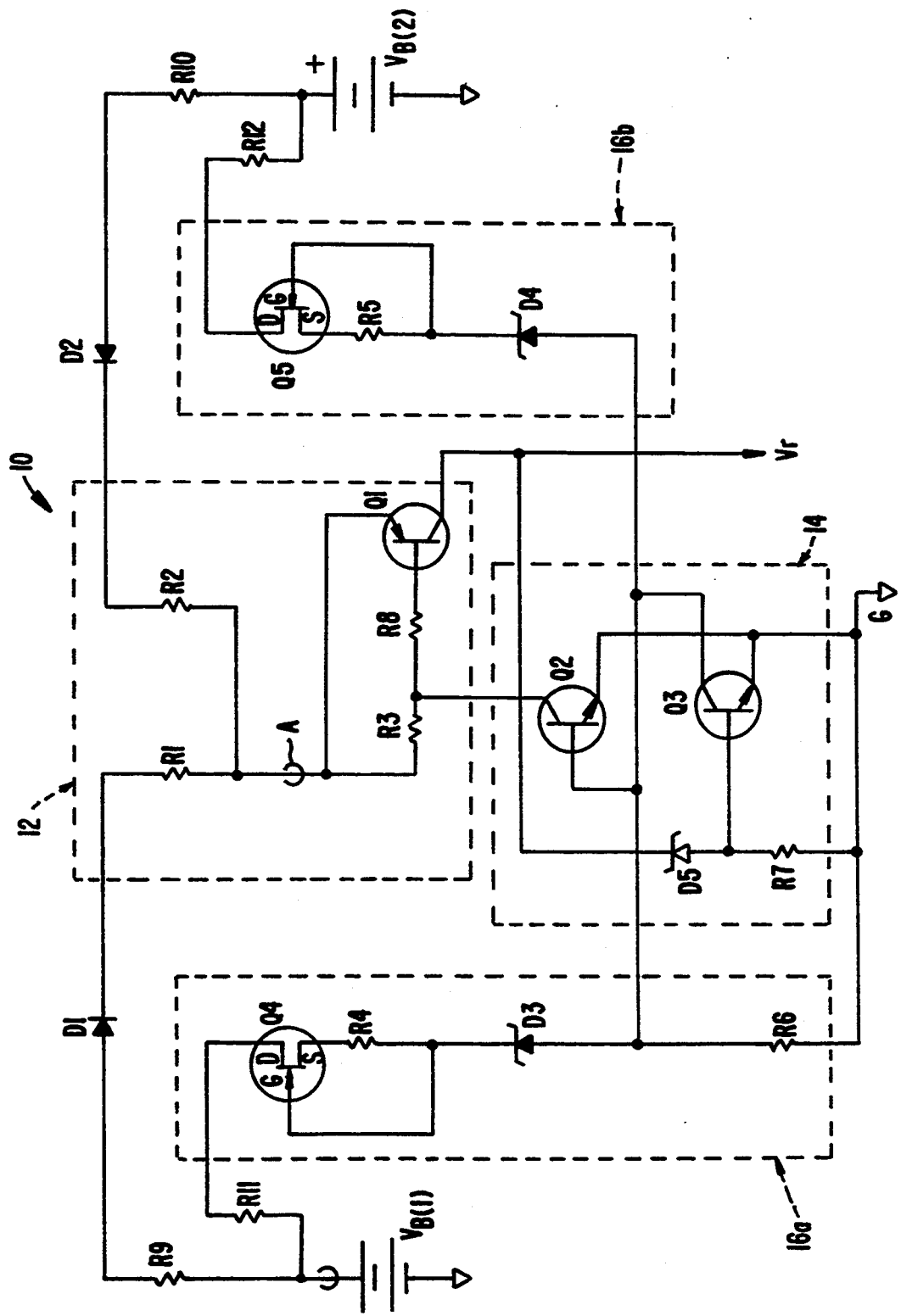
FIG. 2 is a schematic diagram of the regulator circuit.

Referring now to FIG. 2, the detailed schematic of the regulator system 10 shows that the variable impedance 12 comprises a PNP transistor Q1 whose emitter lead is connected to each of the batteries $V_{B(1)}$, $V_{B(2)}$ through the resistors R1 and R2. The collector lead of the transistor Q1 supplies the regulated voltage Vr.

Control of the transistor Q1 is effected by the control circuit 14 which, as FIG. 2 shows, comprises the two NPN transistors Q2, Q3, and a zener diode D5 connected in series to ground by a resistor R7. The zener diode D5 has a 2.5 VDC breakdown (zener) voltage. What little current is drawn by the resistor R7 biases the diode D5 to operate beyond the knee in the zener current-voltage curve in a more linear voltage region. The regulated voltage Vr is established at the zener voltage of the diode D5 (i.e., 2.5 VDC) plus the base to emitter junction voltage $V_{be}$ (i.e., 0.6–0.7 VDC), and is controlled in a manner that will be described below.

Diodes D1, D2 couple the batteries $V_{B(1)}$, $V_{B(2)}$ to the emitter lead of the transistor Q1 (through the resistors R1, R2) to prevent a higher-charged one of the batteries $V_{B(1)}$, $V_{B(2)}$ from attempting to charge the lower-charged battery. Connected in series with each of the diodes D1, D2, are current limiting resistors R9, R10 to protect the batteries from possible overcurrent damage. (In similar fashion resistors R11 and R12 limit the current supplied the sense circuits 16a, 16b, respectively.)

The batteries $V_{B(1)}$ and $V_{B(2)}$ are also protected against discharging them too deeply by sense circuits 16. As FIG. 2 illustrates, each sense circuit 16 respectively comprise a series connection of a depletion mode field effect transistor (FET), resistor, and zener diode Q4/R4/D3 and Q5/R5/D4, together with resistance R6.

The regulator system 10 operates to produce a regulated (low) voltage e.g., 3.2 VDC developed from a much higher DC voltage that can often be found in a larger data processing system: the 24 VDC used to provide backup power to memories when main or primarily power is lost or removed. Such batteries are constructed to have a current delivering capability to be depleted over time. However, as the batteries are used, the nominal terminal voltage can drop significantly. The regulator system 10 is constructed to maintain the desired regulated voltage level, Vr, over the entire range of operation which can be as much a 6–7 volts (e.g., from approximately 26 volts when fully charged, down to a depleted voltage of about 20 volts). The magnitude of the regulated voltage (approximately 3.2 volts) is about one-half that of the voltage range of the backup supply, making regulation not an easy task.

Operation of the regulator system 10 is as follows. The resistors R1, R2 (in conjunction with the resistors R9 and R10) function to balance the current drawn from the batteries, and limit the maximum value of current that can be supplied to the regulator system 10 and the load receiving the regulated voltage Vr. As indicated above, the diodes D1, D2 operate to prevent one battery with a higher terminal voltage from charging the other.

The resistors R1, R2 (and corresponding diodes D1, D2) couple the (positive) unregulated voltage from the batteries $V_{B(1)}$, $V_{B(2)}$ jointly to node A for application to the emitter of the transistor Q1. The unregulated voltage at node A is also used to bias the transistor Q1 by being coupled to its base through resistors R3, R8.

The transistor Q1 operates to present an impedance in the series path between each of the batteries $V_{B(1)}$, $V_{B(2)}$ and the load (not shown) receiving the regulated voltage Vr. Conduction of the transistor Q1, and accordingly the impedance it presents in the series path between the batteries and the load is controlled by the transistors Q2, Q3 forming the control circuit 14. The transistor Q3 operates, in effect, to compare the regulated voltage Vr to a voltage reference set, in effect, by the zener diode D5 and the base-emitter voltage ($V_{be}$) of the transistor Q3. As the regulated voltage Vr attempts to rise, that rise will be reflected to the base of the transistor Q3, causing the transistor Q3 to increase conduction. The increased conduction of transistor Q3 operates to pull increased current from the sense circuits 16a, 16b so that the voltage across the resistance R6 drops, pulling the base of the transistor Q2 down, and forcing it to conduct less. Reducing the conduction of the transistor Q2 will, in turn, result in a corresponding current flow reduction through the resistance R3, diminishing the voltage drop thereacross. The base of the transistor Q1 is thereby allowed to be pulled up toward the unregulated voltage at its emitter to reduce the conduction capacity of that transistor, in turn increasing its effective impedance presented in the series circuit between the unregulated voltage at node A and the load receiving the regulated voltage Vr.

Conversely, if the regulated voltage Vr attempts to drop, that voltage drop is reflected back to the base of the transistor Q3, reducing its current conducting capacity. This increases the amount of current supplied the resistor R6, causing a voltage rise at the base of the transistor Q2. Transistor Q2 turns on harder, pulling the voltage at the base of the transistor Q1 lower and, thereby, increasing its conduction, and effectively decreasing its effective impedance presented between its emitter (which receives the unregulated voltage) and collector (which supplies the regulated voltage). The end result: the regulated voltage Vr is maintained fixed at the level established by the zener diode D5 and base-emitter junction voltage $V_{be}$ of the transistor Q3.

The base resistance R3 of transistor Q1 performs a dual function: first, it limits the current supplied (and drawn by) the transistor Q2, and second it provides a pull up for the base of the transistor Q1. The resistance R8 prevents the possibility of a latch-up condition from occurring when the regulated voltage Vr is first applied to a load that may be highly capacitive. A capacitive load, as is well known, will draw an excessive amount of current when power is first applied. This initial current rush can cause the transistor Q2 to be pulled into saturation. If the resistance R8 were not present, the base of the transistor Q1 could be pulled virtually to ground, preventing the transistor Q3 from ever turning on. With transistor Q3 held in a non-conductive state, the current through transistor Q2 cannot be controlled (as it would when Q3 conducts). Thus, the voltage at the collector of the transistor Q2 cannot be raised in order to induce a concurrent voltage rise at the base of the transistor Q1 to reduce its conduction. The resistance R8 in parallel with resistor R3 form a voltage divider with the resistances R1, R2 to limit how much the emitter voltage of transistor Q1 (and, therefore, the base voltage of that transistor) can be pulled down. This, in turn, forces the collector of the transistor Q1 to be at a high enough voltage to allow the transistor Q3 to turn on and provide feedback regulation.

The sense circuits 16 are provided to shut the regulation system down when the terminal voltages of the both batteries $V_{B(1)}$, $V_{B(2)}$ drop below a predetermined voltage, here approximately 20 VDC. When both batteries drop below this predetermined voltage, the sense circuits 16 will drastically reduce their current conduction so that the voltage developed across the resistor R6 drops to pull down the base of transistor Q2 and cause it to reduce conduction. This allows the base of the transistor Q1 to be pulled up toward whatever unregulated voltage is available. Transistor Q1 ceases to conduct to present a very high impedance between the unregulated voltage at node A and the load, in effect removing the regulated voltage Vr from the load.

Both sense circuits 16 are identical in structure and function and, therefore, only the sense circuit 16a will be described. It will be understood, however, that the discussion of the sense circuit 16a should be taken to apply also to sense circuit 16b, unless otherwise noted.

Continuing with FIG. 2 then, the FET Q4 and resistor R4 of the sense circuit 16a operate to form a current source that supplies current to the zener diode D3 (having a 20 volt zener voltage) and resistor R6, as well as to the collector of the transistor Q3 and base of the transistor Q2. (The diodes D3, D4 also perform the function of keeping the batteries from charging one another when only one drops below the predetermined level and the other is still able to provide sufficient voltage). The pinch-off voltage of the FET Q4 is developed across the resistance R4.

When the voltage supplied by the battery $V_{B(1)}$ drops to, or below, approximately 20 VDC, the cathode of the zener diode D3 will drop below its zener voltage and, therefore, cease to conduct, terminating current flow from the battery $V_{B(1)}$. If, however, the battery $V_{B(2)}$ is still above the 20 volt level, it will continue to supply current to the resistance R6 and the transistors Q2, Q3.

If both the batteries $V_{B(1)}$, $V_{B(2)}$ drop below the predetermined voltage level, both diodes D3 and D4 will open so that the current supplied the base of the transistor Q2 and collector of transistor Q3 are removed. In fact, it does not matter if the transistor Q3 completely ceases conduction; transistor Q2 does cease conduction, causing the base of the transistor Q1 to be pulled up to correspondingly pull the transistor Q1 out of conduction.

Thus, the result of the terminal voltages of the batteries $V_{B(1)}$, $V_{B(2)}$ both dropping below the 20 VDC level is a complete shut down of the regulation circuit 10 and a substantial reduction in current draw from the batteries since only leakage currents are drawn by the elements Q4/D3, Q5/D4, and transistor Q1.

It will be recognized by those skilled in this art that the components used in the regulation circuit 10 should have good low current operation. In particular, the transistors should have decent beta values at low current levels and low leakage current conduction when in cutoff condition. Preferably, transistor Q1 is a 2N2907A, and transistors Q2, Q3 are 2N2222A type transistors. The FETs Q4, Q5 are NF5101 type devices. The zener diodes D3, D4 each have a zener voltage of 20 VDC. Other values are: resistors R1, R2=36K ohms; resistor R3=100K ohms; resistors R4, R5=22.17K ohms; resistors R6, R7=62K ohms; resistor R8=100K ohms; resistors R9, R10=10K ohms; and diodes D1, D2 are MLL4001 MELF type devices.

As has been indicated above, the regulator circuit 10 operates from a back-up supply of DC voltage that may also supply DC voltage to other loads (e.g., a main memory—not shown) when main power fails or is otherwise terminated. It may happen, however, that such other loads will discharge one of the batteries $V_{B(1)}$, $V_{B(2)}$ faster than the other, so that the one battery may reach that voltage level (20 volts DC) at which the associated sense circuit 16 will terminate current flow from that battery. At the same time, the other battery may have a charge only a few volts above the 20 volt level. Given this situation, the voltage at node A can be below 20 volts so that both batteries, including the battery that has been discharged to the 20 volt level, can continue to source current.

To put it another way, the current flow through any one of the paths containing D1/R1 or D2/R2 will drop a voltage of a certain magnitude. If the difference between the terminal voltages of the batteries $V_{B(1)}$, $V_{B(2)}$, is less than this magnitude, and the terminal voltage of at least one battery is greater than the 20 volt level, both batteries will source current. Of course, this is not a problem when both batteries $V_{B(1)}$, $V_{B(2)}$ are above the 20 VDC level. It can become a problem when one battery drops to this level.

For example, assume the battery $V_{B(2)}$ has discharged to 20 volts (or thereabouts) so that the current no longer should be drawn from it to protect from too deeply discharging the battery. Assume further that the battery $V_{B(1)}$ has been discharged to about 22 volts DC. Assume also that the regulator circuit 10 and the load receiving the regulated voltage Vr will together draw about 100 microamps. It can be seen that there will be voltage dropped by current supplied by the battery $V_{B(1)}$ to node A of about 4 volts, so that node A will be at about 18 volts. This allows the battery $V_{B(2)}$ to source current, creating a situation in which the battery $V_{B(2)}$ can be discharged below a level considered safe.

In order to minimize the magnitude of the voltage drop developed across the paths R1/D2, R2,D2, an alternative approach to supplying the unregulated voltage to the emitter of the transistor Q1 is shown in FIG.

3. The circuit shown in FIG. 3 lowers the voltage MAGNITUDE difference between the terminal voltages of the batteries $V_{B(1)}$, $V_{B(2)}$ at which the above situation can occur.

Figure 3:
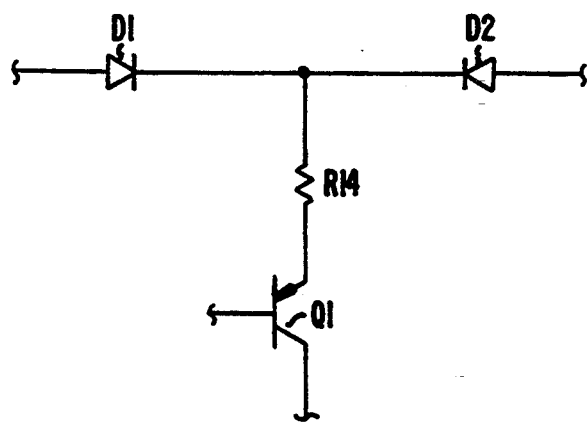
FIG. 3 is an alternative approach to supplying the unregulated voltage from redundant batteries to the regulating device of the regulator circuit.

As FIG. 3 shows, the resistors R1, R2 are replaced with the single resistor R14, and cathodes of the diodes D1, D2 are both connected to each other and to one terminal of the resistor R14. The other terminal of the resistor R 14 connects to the emitter of the transistor Q1. The anodes of the diodes D1, D2 continue to be connected, as shown in FIG. 2, to the resistors R9, R10 respectively. The common connection between the cathodes of the diodes D1, D2 lowers the difference voltage between the two batteries $V_{B(1)}$, $V_{B(2)}$ beyond which the lower charged battery will source current.

In the circuit FIG. 3 the resistors R9 and R10 function to balance the current sourced by the batteries $V_{B(1)}$, $V_{B(2)}$. The resistance R14 is used to limit the maximum value of current that can be supplied to the regulator system 10 and the load receiving the regulated voltage Vr. The size the resistor R14 can be made to restrict the allowed current to a very small value without the negative impact of increasing the difference voltage within which a battery with lower terminal voltage will contribute current. Further, the value of the resistors R9 and R10 in conjunction with the current supplied the node A determine this difference voltage.

What is claimed is:

1. A voltage regulator, operating to supply a regulated direct current voltage from a positive unregulated voltage, the voltage regulator comprising:
    variable impedance means coupled to receive the unregulated voltage to supply therefrom the regulated voltage, the variable impedance means including a control terminal for receiving a control signal, the variable impedance means being responsive to the control signal to maintain the regulated voltage at substantially a fixed value;
    control circuit means coupled to receive the regulated voltage for generating therefrom the control signal to maintain the regulated voltage at the fixed value, the control circuit means including reference circuit means coupled to detect a difference between the regulated voltage and the fixed value from which the control circuit means develops the control signal indicative of the difference; and
    sense means coupled to the unregulated voltage and to the control circuit means to cause the control circuit means to de-assert the control signal to place the variable impedance means in a high impedance state when the unregulated voltage has dropped to a predetermined voltage level.

2. The voltage regulator of claim 1, wherein the variable impedance means includes a PNP transistor having a emitter lead coupled to receive the unregulated voltage, a collector lead whereat the regulated voltage is provided, and a base lead coupled to receive the control signal.

3. The voltage regulator of claim 2, wherein the base lead of the PNP transistor is coupled to the unregulated voltage.

4. The voltage regulator of claim 2, wherein the reference circuit means includes a diode means having a cathode coupled to the regulated voltage and an anode, and resistance means coupled between the anode and a ground potential.

5. The voltage regulator of claim 4, wherein the diode means is a zener diode.

6. The voltage regulator of claim 1, wherein the positive unregulated voltage is supplied by a battery.

7. The voltage regulator of claim 1, including DC battery means for supplying the positive unregulated voltage.

8. The voltage regulator of claim 7, wherein the DC battery means includes a pair of DC batteries; each respectively coupled to a voltage node by a diode and a resistance in series circuit configuration to supply the unregulated voltage at the voltage node, the variable impedance means being coupled to the voltage node to receive the positive unregulated voltage.

9. The voltage regulator of claim 8, wherein the sense means includes for each of the DC batteries a sense circuit operable to substantially terminate current flow from the corresponding one of the DC batteries when the unregulated voltage supplied by the battery drops to and/or below the predetermined voltage level.

10. A voltage regulator for supplying a regulated voltage derived from a redundant battery supply comprising at least two batteries each supplying an unregulated voltage, the voltage regulator comprising:
    circuit means coupled to the redundant battery supply for receiving together the regulated voltages from the two batteries to provide therefrom the regulated voltage, the circuit means including first circuit means for providing a fixed reference voltage indicative of the regulated voltage, second circuit means for generating an error indication of a difference between the fixed reference voltage and the regulated voltage, and variable resistance means coupled to adjust the regulated voltage in response to the error indication; and
    sense means coupled to the circuit means and to each of the two batteries for terminating operation of the circuit means when the unregulated voltages both fall below a predetermined voltage level.

11. The voltage regulator of claim 10, wherein the sense means includes, for each of the two batteries, and in series circuit configuration, a current source means for providing a fixed current, and a sense element for monitoring the associated one of the two batteries.

12. The voltage regulator of claim 11, wherein the sense element is a diode means.

13. The voltage regulator of claim 12, wherein the diode means is a zener diode.

14. The voltage regulator of claim 12, wherein the current source includes a depletion mode field effect transistor in series connection with a resistor, the field effect transistor having a drain lead coupled to an associated battery, a source lead coupled through a resistance means to the diode means.

15. A voltage regulator for supplying a regulated voltage derived from at least a pair of direct current batteries, comprising:
    first and second diodes each respectively coupled to corresponding ones of the pair direct current batteries;
    a first resistance coupling the first and second diodes to a voltage node;
    a PNP transistor having an emitter lead coupled to the voltage node, a base lead, and a collector node whereat the regulated voltage is supplied when the PNP transistor is in conduction;
    a reference circuit coupled to the regulated voltage and operating to develop a reference voltage;
    a compare transistor having a base lead coupled to receive the reference voltage to detect a deviation between the regulated voltage and the reference voltage, the compare transistor including a collector lead; and a control transistor having a collector lead coupled to the base lead of the PNP transistor, and a base lead coupled to the collector lead of the compare transistor;

whereby the deviation detected by the compare transistor is reflected by the control transistor to the base lead of the PNP transistor to increase or decrease conduction of the PNP transistor to maintain the regulated voltage approximately at a fixed value.

16. The voltage regulator of claim 15, wherein the first resistance comprises a first resistor that couples the first diode to the voltage node, and a second resistor that couples the second diode to the voltage node.

17. The voltage regulator of claim 15, wherein the pair of batteries each have positive terminals, and wherein the first and second diodes each have anodes coupled to the positive terminals of corresponding ones of the pair of batteries.

18. The voltage regulator of claim 15, including a sense circuit coupled to the pair of batteries and to the base lead of the control transistor, to cause the control transistor to terminate conduction of the PNP transistor when the unregulated voltage drops below a predetermined value.

19. The voltage regulator of claim 18, wherein the sense circuit includes first and second sensing circuits each coupled to a corresponding one of the pair of batteries, and each comprising, in series, a second resistance a third diode, and a third resistance.

20. The voltage regulator of claim 15, including second and third resistances series connecting the unregulated voltage to the base lead of the PNP transistor, and wherein the collector lead of the control transistor is coupled to the base lead of the PNP transistor by the second resistance, and to the unregulated voltage by the first resistance.

21. The voltage regulator of claim 15, including for each of the pair of batteries, a series circuit, comprising a first transistor coupled to a corresponding one of the pair of batteries, a second resistance coupled to the first transistor, and a third diode coupling to the second resistance to the collector of the compare transistor, the series circuit operating to deliver a current to the collector lead of the compare transistor when the unregulated voltage of the corresponding one of the batteries is greater in magnitude than a predetermined voltage, and to terminate current to the collector of the compare transistor when the unregulated voltage is below the predetermined voltage.

22. The voltage regulator of claim 21, wherein the third diode of each of the series circuits for each of the pair of batteries is a zener diode.

23. The voltage regulator of claim 22, wherein the zener voltage of the first diode is approximately 20 volts.

24. The voltage regulator of claim 21, wherein, for each of the series circuits, the first transistor is a field effect transistor having a gate lead coupled to the third diode, a source lead coupled to the second resistance, and a gate lead coupled to receive the unregulated voltage.

* * * * *